United States Patent Office 3,305,584
Patented Feb. 21, 1967

3,305,584
PROCESS OF PREPARING CATALYST FREE AROMATIC DIAMINES
Ronald B. Spacht, Kent, Ohio, assignor to The Goodyear Tire & Rubber Company, Akron, Ohio, a corporation of Ohio
No Drawing. Filed June 15, 1964, Ser. No. 375,350
4 Claims. (Cl. 260—576)

This application is a continuation-in-part of application Serial No. 750,891, filed June 25, 1958, and now abandoned.

This invention is concerned with condensation catalysts and a process for preparing various diamines. In particular, this invention is concerned with the use and removal of iron halide catalysts in a process for condensing primary amines and hydroquinones.

Various metallic halides, such as aluminum chloride, titanium chloride, and ferric chloride, are known to catalyze the condensation of various amines and various phenols. Unfortunately, polyvalent metal halides as catalysts have not been found completely acceptable in the preparation of diamines which are to be used in rubber as antioxidants because polyvalent metals tend to catalyze the oxidation of the rubber and thus reduce the antioxidant properties of the antioxidants. Also, some of the metallic halides produce low yields due to by-product diphenyl amines and tars which result from complicated side reactions. Several catalysts of this group catalyze the condensation very slowly at low temperatures and require high temperatures and long periods of time. In addition, certain of these catalysts are very corrosive to metal reactors and thus greatly restrict their commercial use.

It is an object of this invention to provide a catalyst system for condensing primary amines and polyhydroxy aromatic compounds. It is a further object of this invention to provide a process for condensing primary amines and polyhydroxy compounds which is characterized by the use of iron halide catalysts and their removal from the reaction products.

In the practice of this invention aromatic diamines are prepared by condensing an amine with a polyhydroxy aromatic compound in the presence of an iron halide catalyst, the iron being thereafter removed by precipitating the same in the form of an insoluble iron salt.

More particularly, the invention is concerned with the process of preparing aromatic diamines comprising (1) preparing a mixture of at least one primary amine and at least one polyhydroxy aromatic compound, (2) adding to said mixture a catalytic amount of an iron halide catalyst and a liquid hydrocarbon capable of forming an azeotrope with water, (3) reacting said mixture while continuously removing the formed water in the form of an azeotrope with the liquid hydrocarbon, (4) removing the pressure and reducing the temperature and thereafter adding to the mixture a sufficient quantity of a water soluble salt to precipitate all of the iron in the form of an insoluble iron salt, (5) removing water and excess volatile reactants by subjecting the reaction mixture to elevated temperatures and reduce pressure, (6) filtering the molten reaction mixture to remove the insoluble iron salts from the formed aromatic diamine, and (7) cooling the aromatic diamine product.

The diamines which can be prepared by the practice of this invention may be described as diamines conforming to the following structural formula

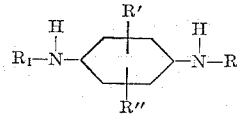

wherein R and $R_1$ may be the same or different primary or secondary alkyl radicals having from 1 to 20 carbon atoms, aralkyl radicals having from 7 to 12 carbon atoms, cycloalkyl radicals having from 5 to 8 carbon atoms, aryl radicals conforming to the following structure

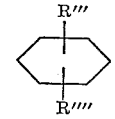

wherein $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms, and wherein $R'$ and $R''$ may be hydrogen or primary or secondary alkyl radicals containing from 1 to 20 carbon atoms.

In preparing the diamines of this invention, which are useful as antioxidants for rubber, the primary amines which may be condensed with the polyhydroxy aromatic compounds may be described as one or a mixture of aliphatic or aromatic primary amines which may be defined by the following structural formula $$R-NH_2$$

wherein R may be a primary or secondary alkyl radical having from 1 to 20 carbon atoms, an aralkyl radical having from 7 to 12 carbon atoms, a cycloalkyl radical having from 5 to 8 carbon atoms, or an aryl radical conforming to the following structure

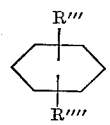

wherein $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms and alkoxy radicals having from 1 to 9 carbon atoms.

The amines which conform to the above and which are useful in the practice of this invention are well known in the art. Illustrative of the aliphatic amines are the primary and secondary butyl, octyl and nonyl amines. Illustrative of the cycloaliphatic amines are cyclohexylamine and methyl cyclohexylamines. Illustrative of the aromatic amines are aniline, o-toluidine, 2,4-xylidine, o-anisidine and p-anisidine.

The polyhydroxy aromatic compounds are preferably hydroquinones such as hydroquinone or substituted hydroquinones wherein the substitution is one or more alkyl radicals containing from 1 to 20 carbon atoms. Corresponding resorcinols and catechols are non-fully equivalent polyhydroxy aromatic compounds which can be used in the practice of this invention.

It has been discovered that iron halides are particularly effective catalysts for the condensation of primary amines and polyhydroxy aromatic compounds. These catalysts may be ferrous or ferric chloride, fluoride, iodide, and bromide. The ferrous and ferric chlorides are particularly effective in the described condensation process. As indicated, the presence of iron in an antioxidant is very undesirable. It has further been discovered that the undesirable iron may be removed by adding a water-soluble salt which is capable of providing an insoluble iron salt to the reaction mixture after the condensation is complete but before the diamines have been purified. The various alkali metal salts which are soluble in water may be used for this purpose. For example, the carbonates, hydroxides, phosphates, sulfides, sulfites, etc., of monovalent metals such as sodium, potassium and lithium may be used for this purpose. Also, the corresponding ammonium salts may also be used. Ammonia is treated herein as an alkali metal. The preferred compound is sodium carbonate because it readily reacts with the iron halide to form insoluble iron compounds and soluble sodium halide, both of which are easily removed from the reaction mixture during the purification process.

The insoluble iron compounds are conveniently removed from the reaction product formed in the condensation reaction between the primary amine and polyhydroxy aromatic compound by filtering the molten reaction mixture at a temperature above the melting point of the formed aromatic diamine. The catalyst-free aromatic diamines that may be produced in accordance with this invention have melting point ranges between 40° C. and 200° C. and it will generally be found advantageous to remove the iron compuond by filtering at a temperature sufficiently above the melting point of the diamine to assure that it will remain in a molten condition through the entire filtering operation, thus facilitating the efficient removal of the contaminating iron compounds.

Although not absolutely necessary in the practice of the invention, it is preferable to add a compound capable of forming an azeotrope with water to the reaction mixture. This compound may also be used as a carrier for the catalyst, if desired, although this is not necessary in practicing the invention. These compounds may be well known liquid hydrocarbons which are capable of forming azeotropes with water which is formed in the condensation reaction. For example, toluene, benzene and xylene may be used for this purpose.

Customary reaction conditions may be used in condensing the primary amines with the polyhydroxy aromatic compounds and will, of course, depend on the reactants being used in preparing the aromatic diamines. The process is customarily practiced in a pressure system which normally ranges between 100 and 150 p.s.i. although it may be practiced at pressures ranging from atmospheric pressure to 20 atmospheres of pressure. The temperature of the reaction will customarily be between 250° C. and 275° C. although temperatures between 220° C. and 320° C. may be used and temperatures between 100° C. and 350° C. are effective in the practice of the invention. The time required for completion of the condensation will, of course, depend upon the temperature, pressure and reactants. Normally the reaction is completed in a period of four to six hours although the time may range from a few minutes to as much as ten hours. The amounts of catalysts used to catalyze the condensation reactions of this invention are the customary catalytic amounts. For example, the catalyst may range from about 1 gram to 10 grams of catalyst per mol of polyhydroxy compound. Preferably about 5 grams of catalyst per mol of polyhydroxy compound is used. The concentration of primary amines in the condensation reaction will customarily range from about 2 to 3 mols of amine per mol of polyhydroxy compound. Since a slight excess of amine over the theoretical proportions of dihydroxy compound is desired, about 2.25 mols of amine per mol of dihydroxy compound is customarily used. The amines and polyhydroxy compounds may be pure compounds or may be mixtures of the respective amines and polyhydroxy compounds.

The invention is further characterized by the following examples which are not intended as limitations on the scope of the invention. The following laboratory experiments were made at atmospheric pressure in a batching vessel designed for the continuous removal of the water of condensation. This was accomplished by using an air condenser which was connected to a downward water-cooled condenser. The temperature of the reaction was controlled so that very little amine distilled from the reaction vessel. The water of condensation was collected in a graduate containing 100 millimeters of toluene. The reaction was followed by the amount of water collected in the graduate. After the reaction was completed the reaction mixture was cooled to about 150° C. The indicated water-soluble salt was then added to the reaction mixture in order to precipitate the iron as an insoluble salt. The volatiles were then removed by heating under vacuum.

*Example 1*

Two hundred and twenty grams of hydroquinone, 125 grams of aniline and 10 grams of ferric chloride were added to a flask. The reaction vessel was heated to a temperature of about 180° C. and gradually raised to about 240° C. An additional 325 grams of aniline were added slowly at this temperature until no more water of condensation came out of the reaction vessel. The reaction mixture was then cooled to 125° C. after which 32 grams of sodium phosphate were dissolved in 125 millimeters of water and added to the flask. After digestion for one-half hour the volatiles were removed by heating the reacted mixtures to 260° C. at 8 millimeters of pressure. The molten product was then filtered to remove the iron as insoluble iron phosphate and obtain the desired diamine product with a very low iron content. Tests indicated that the diamine contained less than 5 parts per million of iron and that the final yield was 481 grams of product having a melting point of 132° C. to 138° C., which was about 92 percent of the theoretical yield.

*Example 2*

The process of Example 1 was repeated except that the iron was removed by means of 30 grams of sodium sulfide. The final diamine weighed 475 grams and had a melting point of 135° C. to 140° C., which was 91.5 percent of the theoretical yield.

*Example 3*

The process of Example 1 was repeated except that 10 grams of sodium hydroxide were used to remove the iron. The final diamine weighed 482 grams and had a melting point of 136° C. to 140° C., which was 92.7 percent of the theoretical yield.

*Example 4*

The process of Example 1 was used except that 25 grams of sodium sulfide were used to remove the iron. The final product had a melting point of 132° C. to 137° C.

*Example 5*

The process of Example 1 was used except that 12.5 grams of sodium carbonate were added to remove the iron. The final product weighed 473.5 grams, had a melting point of 134° C. to 140° C. and gave a yield of 91.5 percent of theoretical.

Using hydroquinone as one reactant, similar experiments have been made wherein the amines used in the reaction were mono and di amyl aniline and mono and di dodecyl aniline. Also, similar experiments have been made using ortho toluidine and para anisidine as the amine reactant. In addition, similar experiments have been made wherein mixtures of amines have been used. For example, various mixtures of aniline and o-toluidine and various mixtures of aniline and cyclohexylamine have been used. In each of the above reactions the iron was removed by means of one of the compounds disclosed in Examples 1 through 5.

Each of the above experiments produced the corresponding diamines in almost theoretical yield in reasonably short periods of time.

The superiority of iron halides over other iron catalysts has been determined by experiments as described in Example 1 except that the indicated catalysts were used in the indicated amounts in place of the ferric chloride. These data are tabulated in Table I.

TABLE I.—VARIOUS IRON SALTS AS CATALYSTS

| Catalysts | Quantity, Mol Hydroquinone in Grams | 50% of Theor. H₂O | | 100% Theor. H₂O | | Yield in Grams | Percent Yield | Melting Point, °C. |
| --- | --- | --- | --- | --- | --- | --- | --- | --- |
| | | Time | Temp., °C. | Time | Temp., °C. | | | |
| FeCl₃ | 5 | 45 min | 240 | 4½ hrs | 258 | 475 | 91.5 | 135–140 |
| Fe(NO₃)₃·9H₂O | 12.5 | 2½ hrs | 258 | (¹) | | | | |
| Fe(C₁₈H₃₅O₂)₃ | 15.0 | 4 hrs | 245 | (¹) | | | | |
| FeNH₄ Citrate | 10.0 | 5½ hrs | 247 | (¹) | | | | |
| Fe(SO₄)₃·6H₂O | 10.0 | 7 hrs | 250 | (¹) | | | | |
| Fe₄(P₂O₇)₃ | 7.5 | (²) | | | | | | |
| FeCl₂·4H₂O | 6.5 | 25 min | 225 | 5 hrs | 252 | 426 | 82 | 136–141 |

¹ Does not react further.
² Completely inactive as a catalyst.

The superiority of iron halides over other metallic halides has been determined by experiments as described in Example 1 except that the indicated catalysts were used in the indicated amounts in place of ferric chloride. These data are tabulated in Table II.

TABLE II.—VARIOUS HALIDES AS CATALYSTS

| Catalysts | Quantity Mol Hydroquinone in Grams | Percent Total H₂O Obtained | Hrs., Time | °C., Temp. | Wt. Prod., Gms. | Percent Yield | Percent Diaryl Para-Phenylene Diamine | Percent Alkali Soluble | Percent Tar |
| --- | --- | --- | --- | --- | --- | --- | --- | --- | --- |
| FeCl₃ | 5.0 | 100 | 4 | 250 | 514 | 93.5 | 85.2 | 1.1 | 12.4 |
| ZnCl₂ | 4 | 100 | 16 | 260 | 450 | 82 | 82 | 6.1 | 11.0 |
| CdCl₂·2H₂O | 6.5 | 82 | 8 | 265 | (¹) | | | | |
| SnCl₂·2H₂O | 6.5 | 100 | 7 | 260 | 448 | 82 | 77.5 | 5.4 | 16.2 |
| HgCl₂ | 5.0 | 100 | 4 | 260 | 464 | 84 | 81.5 | 0.4 | 15.6 |
| PbCl₂ | 5.0 | 80 | 8 | 260 | (¹) | | | | |
| NiCl₂·6H₂O | 9.0 | 95 | 8 | 260 | 152 | 27.0 | | | |
| CuCl₂ | 5.0 | 100 | 6 | 260 | 449 | 82 | 71.3 | 1.0 | 25.9 |
| MnCl₂ | 7.5 | 81 | 8 | 260 | 190 | 35 | | | |
| CoCl₂·6H₂O | 9.0 | 100 | 8 | 260 | 454 | 83 | 78.1 | 4.5 | 16.1 |
| FeCl₂·4H₂O | 8.0 | 100 | 4 | 250 | 456 | 83 | | | |
| CrCl₃·6H₂O | 8.0 | 100 | 4 | 260 | 472 | 86 | 86.5 | 0.7 | 12.0 |
| AlCl₃ | 5.0 | 100 | 5 | 250 | 460 | 84 | | | |
| MgCl₂·6H₂O | 10.7 | 100 | 4 | 260 | 465 | 85 | 78.8 | 5.5 | 15.3 |
| CaCl₂ | 5.0 | 16.0 | 2 | 255 | (²) | | | | |
| MgCl₂·NH₄Cl | 8.5 | 100 | 4 | 260 | 473 | 86.0 | | | |
| HgI₂ | 5.0 | 84 | 7 | 260 | (³) | | | | |

¹ Discontinued, reaction incomplete.
² Very little reaction.
³ Discontinued, Catalyst decomposed.

Thus, it is apparent that the iron halides used in the process described herein are unexpectedly superior catalysts for reacting hydroquinones with primary amines because (1) lower reaction temperatures may be used, (2) reactions are faster, (3) less tarry by-products results, (4) less diphenylamine is produced and (5) a substantial increase in diamine content is made possible. The iron halide catalyzed process, coupled with the removal of iron from the formed diamines, provides unexpectedly superior antioxidants for oxidizable materials such as rubber.

While certain representative embodiments and details have been shown for the purpose of illustrating the invention it will be apparent to those skilled in this art that various changes and modifications may be made therein without departing from the spirit or scope of the invention.

What I claim is:

1. In the process of preparing aromatic diamines comprising reacting (1) a primary amine having the structural formula

R—NH₂ wherein R is selected from the group consisting of primary alkyl radicals containing from 1 to 20 carbon atoms, secondary alkyl radical containing from 1 to 20 carbon atoms, aralkyl radical containing from 7 to 12 carbon atoms, cycloalkyl radical containing from 5 to 8 carbon atoms, and aryl radical conforming to the following structure

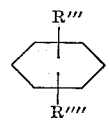

wherein R''' and R'''' are selected from the group consisting of hydrogen, primary alkyl radicals containing from 1 to 20 carbon atoms, secondary alkyl radicals containing from 1 to 20 carbon atoms, aralkyl radicals containing from 7 to 12 carbon atoms, cycloalkyl radicals containing from 5 to 8 carbon atoms and alkoxy radicals containing from 1 to 9 carbon atoms with (2) a polyhydroxy aromatic compound selected from the group consisting of hydroquinones, resorcinols and catechols at a temperature between 100 and 350° C. in the presence of an iron halide condensation catalyst, the improvement wherein iron is precipitated from the hot reaction mixture in the form of an insoluble iron salt, by the addition of a water-soluble alkali metal salt selected from the group consisting of the alkali metal carbonates, alkali metal hydroxides, alkali metal phosphates, alkali metal sulfides and alkali metal sulfites and thereafter filtering the molten reaction mixture to remove said insoluble iron salt from the resulting diamine.

2. In the process of preparing aromatic diamines comprising reacting (1) a primary amine having the structural formula

R—NH$_2$ wherein R is selected from the group consisting of primary alkyl radicals containing from 1 to 20 carbon atoms, secondary alkyl radical containing from 1 to 20 carbon atoms, aralkyl radical containing from 7 to 12 carbon atoms, cycloalkyl radical containing from 5 to 8 carbon atoms and aryl radical conforming to the following structure

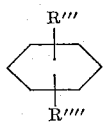

wherein R''' and R'''' are selected from the group consisting of hydrogen, primary alkyl radicals containing from 1 to 20 carbon atoms, secondary alkyl radicals containing from 1 to 20 carbon atoms, aralkyl radicals containing from 7 to 12 carbon atoms, cycloalkyl radicals containing from 5 to 8 carbon atoms and alkoxy radicals containing from 1 to 9 carbon atoms with (2) a dihydroxy aromatic compound selected from the group consisting of hydroquinones, resorcinols and catechols at a temperature between 100 and 350° C. in the presence of an iron halide condensation catalyst, the improvement wherein iron is precipitated from the hot reaction mixture in the form of an insoluble iron salt by the addition of a water-soluble alkali metal salt selected from the group consisting of the alkali metal carbonates, alkali metal hydroxides, alkali metal phosphates, alkali metal sulfides and alkali metal sulfites, and thereafter filtering the molten reaction mixture to remove said insoluble iron salt from the resulting diamine.

3. A process according to claim 2 wherein the soluble alkali metal salt is sodium carbonate.

4. In the process of preparing aromatic diamines comprising reacting aniline with hydroquinone at a temperature between 100 and 350° C. in the presence of ferric chloride, the improvement wherein iron is precipitated from the hot reaction mixture in the form of an insoluble iron salt by the addition of a water-soluble alkali metal salt selected from the group consisting of the alkali metal carbonates, alkali metal hydroxides, alkali metal phosphates, alkali metal sulfides and alkali metal sulfites and thereafter filtering the molten reaction mixture to remove said insoluble iron salt from the resulting diamine.

References Cited by the Examiner

UNITED STATES PATENTS

| | | | |
|---|---|---|---|
| 1,574,337 | 2/1926 | Bogert | 260—571 |
| 1,921,587 | 8/1933 | Semon et al. | 260—576 |
| 2,156,792 | 5/1939 | Neal et al. | 260—576 X |
| 2,156,793 | 5/1939 | Neal et al. | 260—576 X |
| 2,238,320 | 4/1941 | Hardman | 260—576 |
| 3,081,349 | 3/1963 | Spacht | 260—576 |

CHARLES B. PARKER, *Primary Examiner.*

R. V. HINES, *Assistant Examiner.*